(12) United States Patent
Youm et al.

(10) Patent No.: US 12,111,968 B2
(45) Date of Patent: Oct. 8, 2024

(54) HAPTIC FEEDBACK SYSTEM

(71) Applicant: ELECTRONICS AND TELECOMMUNICATIONS RESEARCH INSTITUTE, Daejeon (KR)

(72) Inventors: Wooseup Youm, Daejeon (KR); Hye Jin Kim, Daejeon (KR); YuLim Min, Daejeon (KR); Yun-Jeong Kim, Daejeon (KR); Hanbit Jin, Daejeon (KR); Chan-Hwa Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 113 days.

(21) Appl. No.: 18/050,373

(22) Filed: Oct. 27, 2022

(65) Prior Publication Data
US 2023/0176652 A1 Jun. 8, 2023

(30) Foreign Application Priority Data

Nov. 25, 2021 (KR) .................. 10-2021-0164808
Aug. 16, 2022 (KR) .................. 10-2022-0102190

(51) Int. Cl.
G06F 3/01 (2006.01)
(52) U.S. Cl.
CPC .................................... G06F 3/016 (2013.01)
(58) Field of Classification Search
CPC ............... G06F 3/016; G06F 2203/014; G06F 3/041–047; G06F 2203/041–04114
See application file for complete search history.

(56) References Cited

U.S. PATENT DOCUMENTS

| 8,996,246 | B2 | 3/2015 | Kim | |
| 10,102,725 | B2 | 10/2018 | Levesque et al. | |
| 10,353,471 | B2 | 7/2019 | Da Costa et al. | |
| 2006/0119573 | A1 | 6/2006 | Grant et al. | |
| 2013/0194237 | A1 | 8/2013 | Kyung | |
| 2015/0205352 | A1* | 7/2015 | Grant | G06F 1/163 345/156 |
| 2016/0133034 | A1* | 5/2016 | Son | G06F 3/016 345/174 |
| 2017/0249014 | A1 | 8/2017 | Meyer | |
| 2020/0019245 | A1* | 1/2020 | Ganadas | G06F 3/016 |
| 2021/0278903 | A1 | 9/2021 | Asfour | |
| 2023/0393661 | A1 | 12/2023 | Chun | |

FOREIGN PATENT DOCUMENTS

| KR | 10-2011-0078226 A | 7/2011 |
| KR | 10-2011-0095967 A | 8/2011 |
| KR | 10-2015-0028750 A | 3/2015 |
| KR | 10-2015-0056070 A | 5/2015 |
| KR | 10-2019-0015096 A | 2/2019 |
| KR | 10-2021-0106915 A | 8/2021 |

\* cited by examiner

*Primary Examiner* — Sanjiv D. Patel

(57) ABSTRACT

Provided is a haptic waveform storage system including a sensor configured to measure a target object to generate a sensing signal including tactile texture information, a waveform extraction unit configured to extract a basic frequency and an envelope from the sensing signal and generate haptic waveform information including information about the basic frequency and the envelope, and a library storage unit configured to store the haptic waveform information.

18 Claims, 15 Drawing Sheets

FIG. 6

Class Table

| Haptic Waveform Information \ Class | First Class | Second Class | Third Class |
|---|---|---|---|
| Basic Frequency(Hz) | 5830 | 972 | 123.6 |
| Envelope | ∿ | ∿ | ∿ |

FIG. 7

```
Start
  ↓
Receive class selection signal — S410
  ↓
Receive haptic waveform information corresponding
to the selected class from library — S420
  ↓
Generate rendered waveform signal based on basic
frequency and envelope of haptic waveform information — S430
  ↓
Provide rendered waveform signal to terminal — S440
  ↓
End
```

HAPTIC FEEDBACK SYSTEM

CROSS-REFERENCE TO RELATED APPLICATIONS

This U.S. non-provisional patent application claims priority under 35 U.S.C. § 119 of Korean Patent Application Nos. 10-2021-0164808, filed on Nov. 25, 2021, and 10-2022-0102190, filed on Aug. 16, 2022, the entire contents of which are hereby incorporated by reference.

BACKGROUND

The present disclosure herein relates to a haptic feedback system, and more particularly, to a system, which senses an object to store haptic waveform information in a library form and generates a tactile texture waveform based on the stored waveform information.

The present disclosure relates to a method for generating a haptic interface, i.e., a tactile texture waveform, for immersively and effectively providing physical haptic feedback in the field of haptics for giving a sense of tactile texture to a person. In more detail, the present disclosure relates to a method for generating a realistic tactile texture waveform according to a material or a situation by obtaining, through a sensor, a tactile texture signal generated at the time of interaction such as a collision or friction and by modeling a haptic signal based on features of sensing signals measured in this manner.

SUMMARY

The present disclosure provides a system for achieving a tactile texture waveform at low cost and low computational load.

The purpose of the present disclosure is not limited to the above-mentioned purpose, and other purposes not mentioned would be clearly understood by those skilled in the art from the disclosure below.

An embodiment of the inventive concept provides a haptic waveform storage system including a sensor configured to measure a target object to generate a sensing signal including tactile texture information, a waveform extraction unit configured to extract a basic frequency and an envelope from the sensing signal and generate haptic waveform information including information about the basic frequency and the envelope, and a library storage unit configured to store the haptic waveform information.

In an embodiment, the waveform extraction unit may be configured to calculate the basic frequency based on a rising time of the sensing signal.

In an embodiment, the waveform extraction unit may set a reciprocal number of the basic frequency as a basic period and extract a point having highest intensity from the sensing signal every basic period to extract the envelope.

In an embodiment, the waveform extraction unit may be configured to receive a class setting input for classifying a type of the target object to classify and label the haptic waveform information, and the library storage unit may be configured to store the labeled haptic waveform information in a library form.

In an embodiment, the number of classes in the class setting input may be determined according to the type of the target object, a type of a material, and a type of a measurement situation.

In an embodiment, the library storage unit may include a class table, and the class table may be configured to store the haptic waveform information in a library form.

In an embodiment, the library storage unit may include a data storage medium.

In an embodiment of the inventive concept, a method for operating a haptic waveform storage system includes measuring a target object to generate a sensing signal including tactile texture information, calculating a basic frequency based on a rising time of the sensing signal, setting a basic period corresponding to a reciprocal number of the basic frequency to extract a point having highest intensity from the sensing signal every basic period to extract an envelope, and storing haptic waveform information including information about the basic frequency and the envelope in a library storage unit.

In an embodiment, the method may further include receiving a class setting input for classifying a type of the target object, classifying and labeling the haptic waveform information based on the class setting input, and storing, in the library storage unit, the labeled haptic waveform information in a library form.

In an embodiment, the number of classes in the class setting input may be determined according to the type of the target object, a type of a material, and a type of a measurement situation.

In an embodiment, the library storage unit may include a class table, and the class table may store the haptic waveform information in a library form.

In an embodiment, the library storage unit may include a data storage medium.

In an embodiment of the inventive concept, a haptic feedback system includes a haptic waveform storage system configured to generate haptic waveform information from a target object and store the haptic waveform information in a library storage unit, and a haptic waveform generation system configured to generate a tactile texture waveform based on the haptic waveform information stored in the library storage unit, wherein the haptic waveform information includes information about a basic frequency calculated from a sensing signal measured from the target object and an envelope extracted from the sensing signal, and the haptic waveform generation system is configured to generate a rendered waveform signal by generating a sinewave having the same frequency as the basic frequency and combining the sinewave with the envelope, and generate the tactile texture waveform based on the rendered waveform signal.

In an embodiment, the haptic waveform generation system may include a signal rendering unit configured to receive the haptic waveform information from the library storage unit and generate the rendered waveform signal, and a terminal configured to generate the tactile texture waveform by reproducing the rendered waveform signal.

In an embodiment, the terminal may be a virtual reality (VR) device in which virtual reality is implemented, and may be configured to generate a class selection signal including class information corresponding to an object interacting in the virtual reality, and the signal rendering unit may be configured to receive the haptic waveform information from the library storage unit based on the class selection signal.

In an embodiment, the terminal may include an interface directly connected to a hand of a user, and the interface may be configured to generate the tactile texture waveform by reproducing the rendered waveform signal.

In an embodiment, the haptic waveform storage system may be configured to calculate the basic frequency based on a rising time of the sensing signal and generate the haptic waveform information including information about the basic frequency and the envelope.

In an embodiment, the haptic waveform storage system may be configured to set a reciprocal number of the basic frequency as a basic period and extract a point having highest intensity from the sensing signal every basic period to extract the envelope.

In an embodiment, the library storage unit may include a data storage medium.

In an embodiment, the library storage unit may include a class table that stores the haptic waveform information.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIG. 6 is a diagram illustrating an example in which haptic data is stored in the class table of the library of FIG. 1;

FIG. 7 is a flowchart illustrating an operation of generating a rendered waveform signal in the signal rendering unit of FIG. 1;

DETAILED DESCRIPTION

Figure 1:
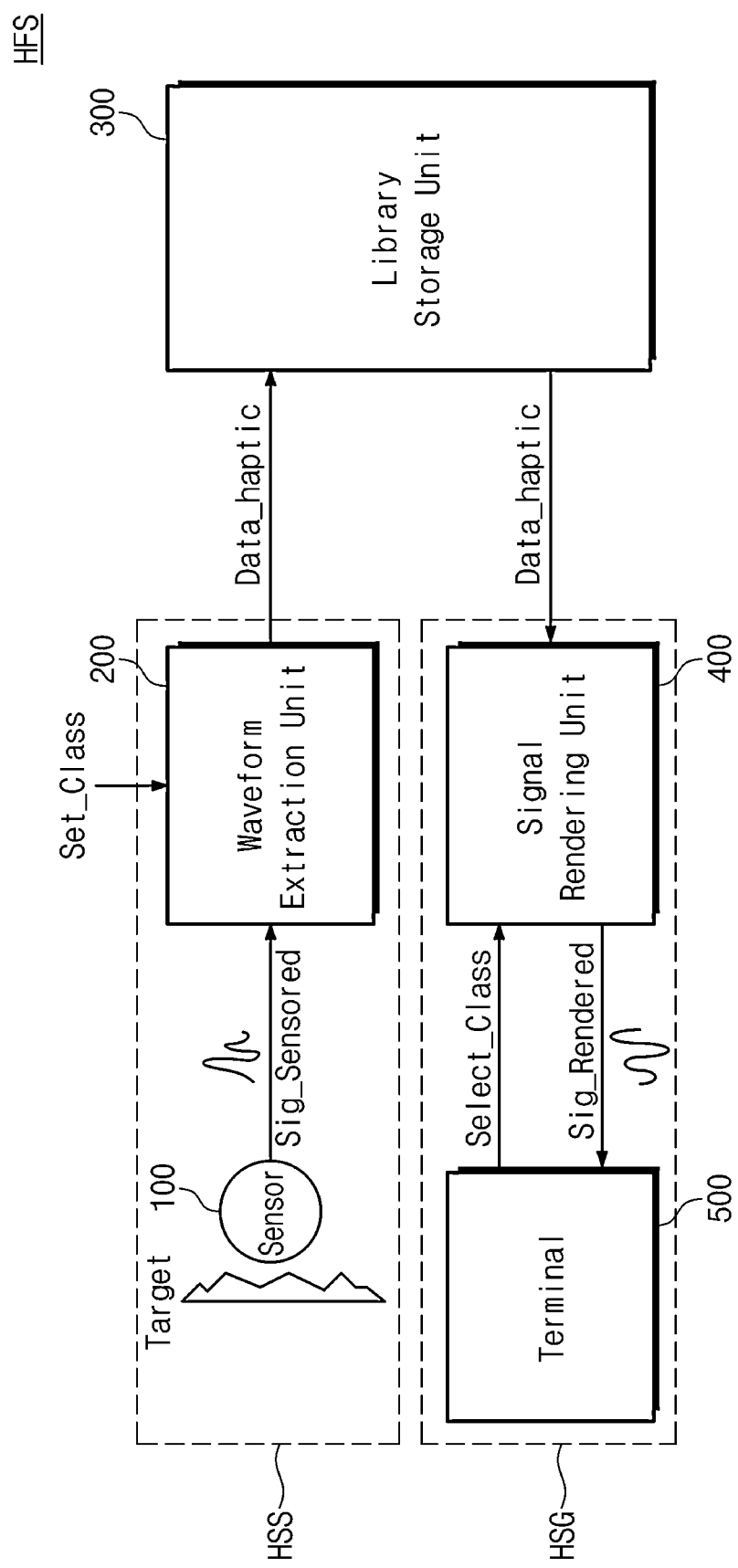
FIG. 1 is a block diagram illustrating an embodiment of a haptic feedback system according to the present disclosure.

Throughout the present disclosure, referring to "one embodiment" or "embodiment" indicates that specific features, structures, or characteristics described in relation to an embodiment may be included in at least one embodiment disclosed in the present disclosure. Therefore, in various portions throughout the present disclosure, the terms "in one embodiment", "in an embodiment, or "according to one embodiment" (or other similar terms) do not necessarily refer to the same embodiment. Furthermore, specific features, structure, or characteristics may be combined in any appropriate manner in one or more embodiments. In relation to this, the term "exemplary" used herein indicates that "example or illustration" is provided. Any embodiment described as "exemplary" in the present disclosure should not be construed as preferable or advantageous over other embodiments. Furthermore, according to the context of a discussion in the present disclosure, singular forms may include corresponding plural forms, and plural terms may include corresponding singular forms. It should be noted that various drawings (including block diagrams) illustrated and discussed in the present disclosure are used for illustrative purposes and are not in real scale. Similarly, various waveforms are illustrated for illustrative purposes only. For example, the dimensions of some elements may be exaggerated in comparison with other elements for clarity. Furthermore, when considered to be appropriate, reference signs are repeated in the drawings in order to indicate the corresponding and/or similar elements.

The terminology used herein is not for delimiting the claimed invention but for describing particular embodiments. The singular terms "a", "an", and "one" used herein also include plural forms unless otherwise indicated. It will be further understood that the terms "include", "comprise", "including", and/or "comprising" used herein specify the presence of stated features, integers, steps, operations, elements, and/or components, but do not preclude the presence or addition of one or more other features, integers, steps, operations, elements, components, and/or groups thereof. The terms "first", "second", and the like used herein are used as labels of antecedent nouns, and do not imply any type of order (e.g., spatial, temporal, or logical order) unless otherwise explicitly defined. Furthermore, in order to refer to portions, configurations, blocks, circuits, units, or modules having the same or similar functions, the same reference numerals may be used over two or more drawings. However, the use of such reference numerals is for simplifying descriptions and facilitating a discussion; and does not indicate that the details of such configurations or units are the same over all embodiments, or portions/modules that are commonly referred to are only ways to implement particular embodiments disclosed in the present disclosure.

Unless otherwise defined, all terms (including technical and scientific terms) used herein have the same meaning as commonly understood by one of ordinary skill in the art to which this invention belongs.

Hereinafter, embodiments of the present disclosure will be described with reference to the accompanying drawings.

FIG. 1 is a block diagram illustrating an embodiment of a haptic feedback system according to the present disclosure.

Referring to FIG. 1, a haptic feedback system HFS according to the present disclosure may include a haptic waveform storage system HSS, a library storage unit 300, and a haptic waveform generation system HGS.

The haptic waveform storage system HSS may include a sensor 100 and a waveform extraction unit 200, and the haptic waveform generation system HGS may include a signal rendering unit 400 and a terminal 500.

In an embodiment, the haptic waveform storage system HSS may generate haptic waveform information Data_haptic by measuring a sensing signal Sig_sensored from a target object. The library storage unit 300 may store the haptic waveform information in a library form. The haptic waveform generation system HGS may generate a tactile texture waveform through the terminal 500 using the haptic waveform information Data_haptic stored in the library storage unit 300.

The sensor 100 may be configured to generate the sensing signal Sig_sensored by measuring a signal that is generated in a situation such as a collision or friction of the target object. The sensing signal Sig_sensored may be a waveform signal including tactile texture information about a surface of the target object. For example, the target object may include metal, wood, rubber, or the like, and the sensing signal Sig_sensored may be an electric waveform signal including information about a sense of touch or texture of a surface of each object.

The sensor 100 may be included in the haptic feedback system HFS, but is not limited thereto and may be included in an interface arranged outside the haptic feedback system HFS to generate and transfer the sensing signal Sig_sensored to the system.

The waveform extraction unit 200 may be configured to receive a class setting input set_class and the sensing signal Sig_sensored. The waveform extraction unit 200 may be configured to generate the haptic waveform information Data_haptic from the sensing signal Sig_sensored generated from the sensor 100 and label the haptic waveform information data_haptic according to the class setting input set_class.

The haptic waveform information Data_haptic may include information about a basic frequency and envelope extracted from the sensing signal Sig_sensored. A specific operation of extracting the basic frequency and envelope in the waveform extraction unit 200 will be described with reference to FIGS. 2 to 4.

The class setting input set_class may be a signal for classifying the type of the target object measured by the sensor 100, the type of a material, and/or the type of a measurement situation. The class setting input set_class may be input by a user, and may include information about a plurality of classes.

For example, the class setting input set_class may include a first class, a second class, and/or a third class according to the type of the target object. For example, the first class may be the target object being wood, the second class may be the target object being metal, and the third class may be the target object being rubber.

However, the first to third classes are merely examples, and the number of classes may be determined according to the numbers of the types of target objects and the types of materials to be measured. Furthermore, the number of classes may be increased according to a measurement situation of the target object. For example, a fourth class may be set as a collision situation, and a fifth class may be set as a friction situation.

For example, first haptic waveform information about wood may be labeled as the first class, second haptic waveform information about metal may be labeled as the second class, and third haptic waveform information about rubber may be labeled as the third class. The waveform extraction unit 200 may provide each of pieces of the labeled haptic waveform information Data_haptic to the library storage unit 300.

The library storage unit 300 may receive the haptic waveform information Data_haptic from the waveform extraction unit 200 and store the same. The library storage unit 300 may store the haptic waveform information Data_haptic in a library form according to a labeled class.

The library storage unit 300 may include a class table, wherein the class table may store the haptic waveform information Data_haptic rendered in a library form.

The library storage unit 300 may include a data storage medium. The library storage unit 300 may include a memory device. For example, the memory device may include double data rate synchronous dynamic random access memory (DDR SDRAM), low power double data rate (LPDDR) SDRAM, graphics double data rate (GDDR) SDRAM, and Rambus DRAM (RDRAM). Alternatively, the memory device may include a nonvolatile memory such as flash memory, magnetic RAM (MRAM), ferroelectric RAM (FRAM), and phase change RAM (PRAM).

The haptic waveform information Data_haptic stored in the library storage unit 300 may be provided to the signal rendering unit 400.

The signal rendering unit 400 may generate a rendered waveform signal Sig_rendered based on the haptic waveform information Data_haptic received from the library storage unit 300. For example, the signal rendering unit 400 may receive a class selection signal select_class from the terminal 500. The class selection signal select_class may be a signal for selecting haptic waveform information corresponding to a specific class from among pieces of haptic waveform information stored in a library form in the library storage unit 300.

The signal rendering unit 400 may receive the haptic waveform information Data_haptic corresponding to a specific class from the class table of the library storage unit 300 based on the received class selection signal select_class. A specific operation of generating the rendered waveform signal Sig_rendered in the signal rendering unit 400 will be described with reference to FIGS. 7 and 8.

The terminal 500 may be configured to generate and provide the class selection signal select_class to the signal rendering unit 400. For example, the terminal 500 may be a virtual reality (VR) device in which virtual reality is implemented, and the class selection signal select_class may be class information corresponding to an object with which the user interacts in virtual reality using the terminal 500.

For example, when the user touches wood in the virtual reality implemented in the terminal 500, the terminal 500 may generate the class selection signal select_class for selecting the first class corresponding to wood. When the user touches metal in the virtual reality implemented in the terminal 500, the terminal 500 may generate the class selection signal select_class for selecting the second class corresponding to metal. When the user touches rubber in the virtual reality implemented in the terminal 500, the terminal 500 may generate the class selection signal select_class for selecting the third class corresponding to rubber.

The terminal 500 may be configured to receive the rendered waveform signal Sig_rendered from the signal rendering unit 400 and reproduce a tactile texture waveform. In an embodiment, the terminal 500 may include an interface directly connected to a hand of the user, wherein the interface may be configured to reproduce the rendered waveform signal Sig_rendered to allow the user to sense a tactile texture waveform on the hand.

The haptic feedback system HFS according to the present disclosure stores, in a library form, only information about the basic frequency and envelope of a sensing signal instead of storing an entire sensing signal, and thus may reduce a size of data stored to implement a tactile texture waveform and may implement a tactile texture waveform with low computational load.

Figure 2:
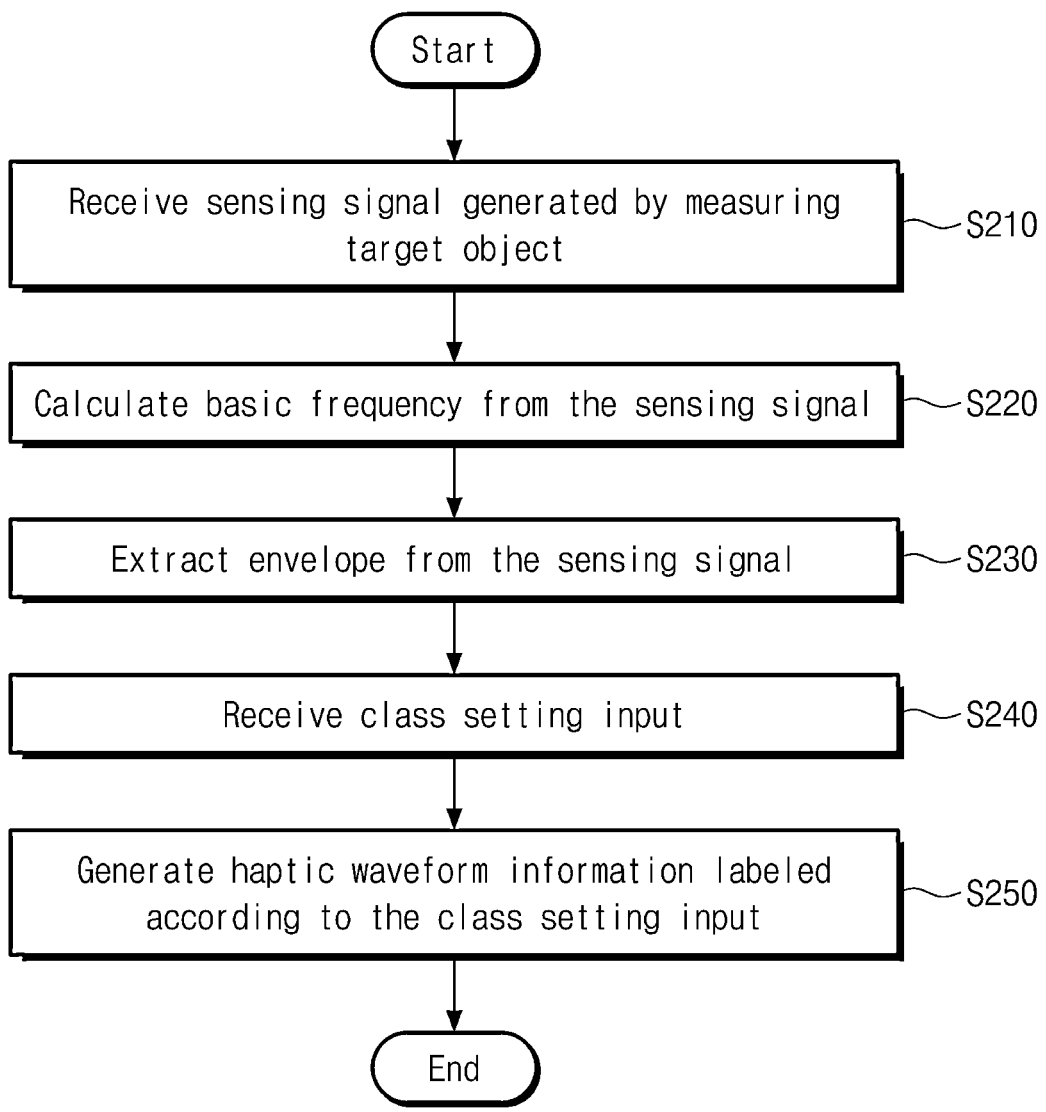
FIG. 2 is a flowchart illustrating a library method for storing haptic waveform information about a target object in a library in the haptic waveform storage system HSS.
Figure 3:
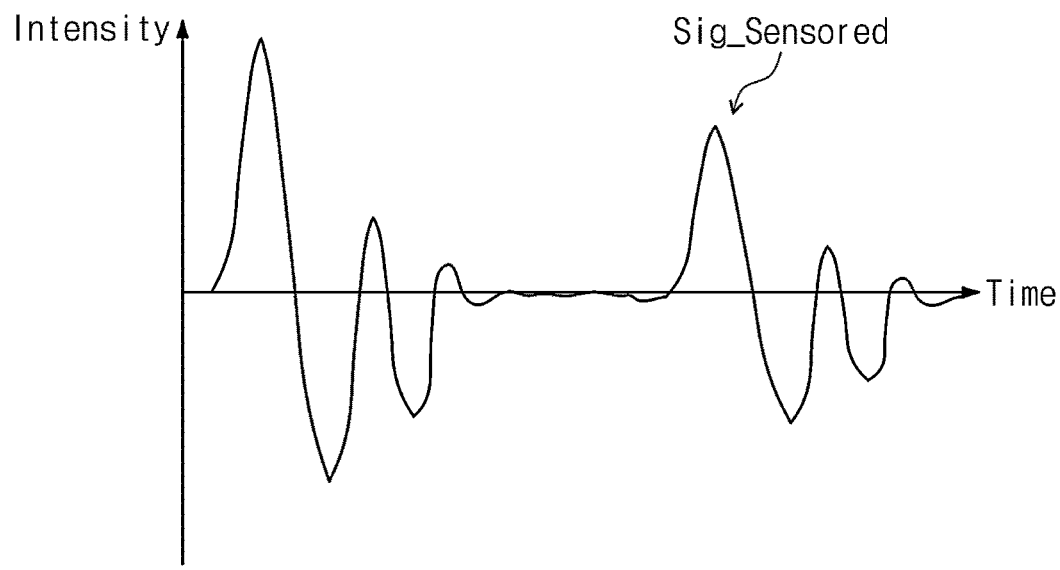
FIG. 3 is a diagram illustrating an example of a sensing signal measured in the sensor of FIG. 1.
Figure 4:
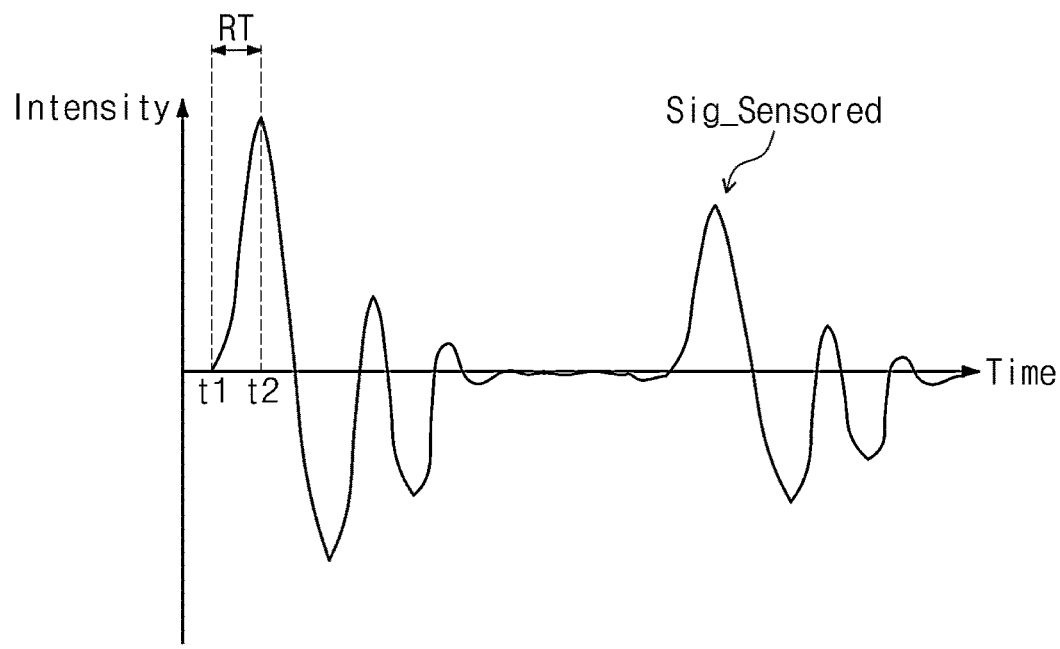
FIG. 4 is a diagram for describing extraction of a basic frequency from the sensing signal of FIG. 3.
Figure 5:
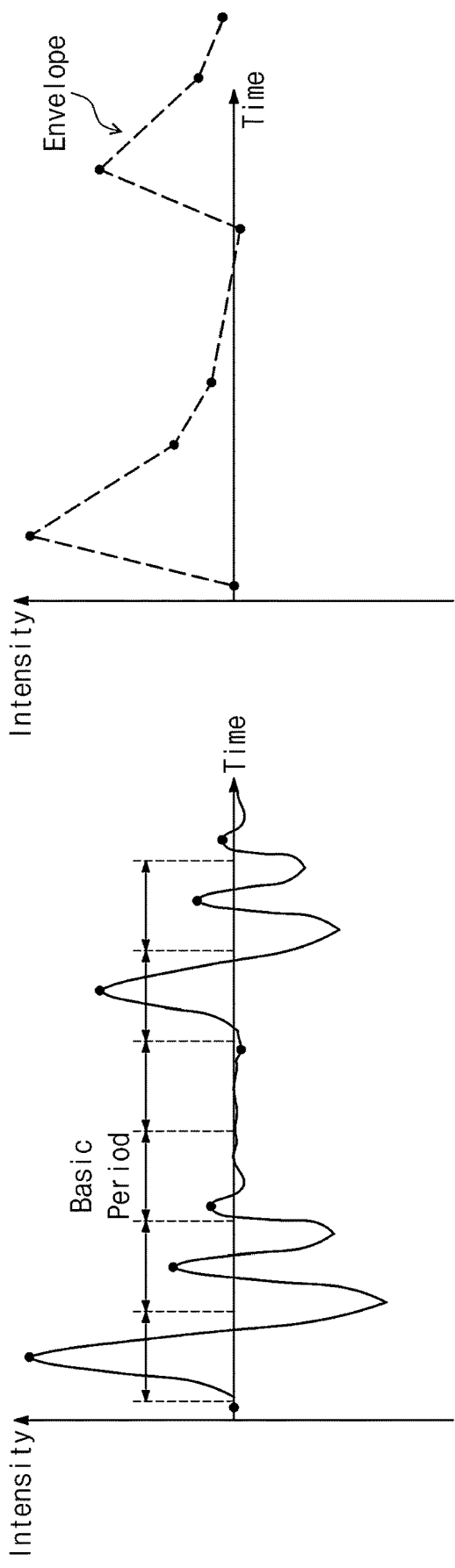
FIG. 5 is a diagram for describing extraction of an envelope from the sensing signal of FIG. 3.

FIG. 2 is a flowchart illustrating a library method for storing haptic waveform information about a target object in a library in the haptic waveform storage system HSS. FIG. 3 is a diagram illustrating an example of a sensing signal measured in the sensor of FIG. 1. FIG. 4 is a diagram for describing extraction of a basic frequency from the sensing signal of FIG. 3. FIG. 5 is a diagram for describing extraction of an envelope from the sensing signal of FIG. 3. FIG. 6 is a diagram illustrating an example in which haptic data is stored in the class table of the library of FIG. 1. Hereinafter, operation of the waveform extraction unit 200 will be described in detail with reference to FIGS. 1 to 6.

Referring to FIGS. 2 and 3, in operation S210, the waveform extraction unit 200 of the haptic waveform storage system HSS may receive, from the sensor 100, the sensing signal Sig_sensored generated by measuring a target object. The sensing signal Sig_sensored may be a waveform signal including tactile texture information about a surface of the target object. For example, the target object may include metal, wood, rubber, or the like, and the sensing signal Sig_sensored may be an electric waveform signal including information about a sense of touch or texture of a surface of each object.

In operation S220, the waveform extraction unit 200 may calculate a basic frequency from the sensing signal Sig_sensored. The basic frequency may be calculated by measuring a rising time RT of the sensing signal Sig_sensored. The rising time RT of the sensing signal Sig_sensored may be defined as a time from a point in time at which intensity of the sensing signal Sig-sensored begins to change in the sensor 100 due to an interaction with the target object to a point in time at which the intensity of the sensing signal Sig_sensored reaches a maximum value and begins to decrease.

Referring to FIG. 4, since the intensity of the sensing signal Sig_sensored begins to change at a first time point t1 and reaches the maximum value at a second time point t2, the rising time RT corresponds to a period between the second time point t2 and the first time point t1.

The waveform extraction unit 200 may calculate a minimum bandwidth frequency through Equation 1 below based on the rising time RT.

$$f_{Bandwidth} = \frac{\omega}{2\pi} \approx \frac{2.2}{2\pi * T_R} \approx \frac{0.35}{T_R} \quad \text{[Equation 1]}$$

In Equation 1, $f_{Bandwidth}$ denotes the minimum bandwidth frequency, $\omega$ denotes an angular frequency, and $T_R$ denotes the rising time RT measured from the sensing signal. The waveform extraction unit 200 may calculate the minimum bandwidth frequency as the basic frequency.

In operation S230, the waveform extraction unit 200 may extract an envelope of the sensing signal Sig_sensored. The waveform extraction unit 200 may set a basic period based on the basic frequency, and may extract and sample maximum values from the sensing signal Sig_sensored every basic period.

Referring to FIG. 5, the waveform extraction unit 200 may extract the envelope by sampling points having highest intensity from the sensing signal Sig_sensored every basic period. The basic period P may be defined as a time corresponding to a reciprocal number of the basic frequency. The waveform extraction unit 200 may extract the envelope by connecting the sampled points.

In operation S240, the waveform extraction unit 200 may receive the class setting input set_class. The class setting input set_class may be a signal generated according to a user input in order to classify the type of the target object measured by the sensor 100, the type of a material, and/or a measurement situation. For example, the class setting input set_class may include a first class, a second class, and a third class according to the type of the target object.

In operation S250, the waveform extraction unit 200 may label the haptic waveform information Data_haptic including information about the basic frequency and envelope extracted in operations S220 and S230 based on the class setting input set_class. For example, first haptic waveform information about wood may be labeled as the first class, second haptic waveform information about metal may be labeled as the second class, and third haptic waveform information about rubber may be labeled as the third class.

Referring to FIG. 6, the haptic waveform information generated by the waveform extraction unit 200 may be stored in a library according to each labeled class. The library may include a class table, wherein the class table may store, in a library form, information about the basic frequency and envelope of the haptic waveform information corresponding to each class.

Figure 8:
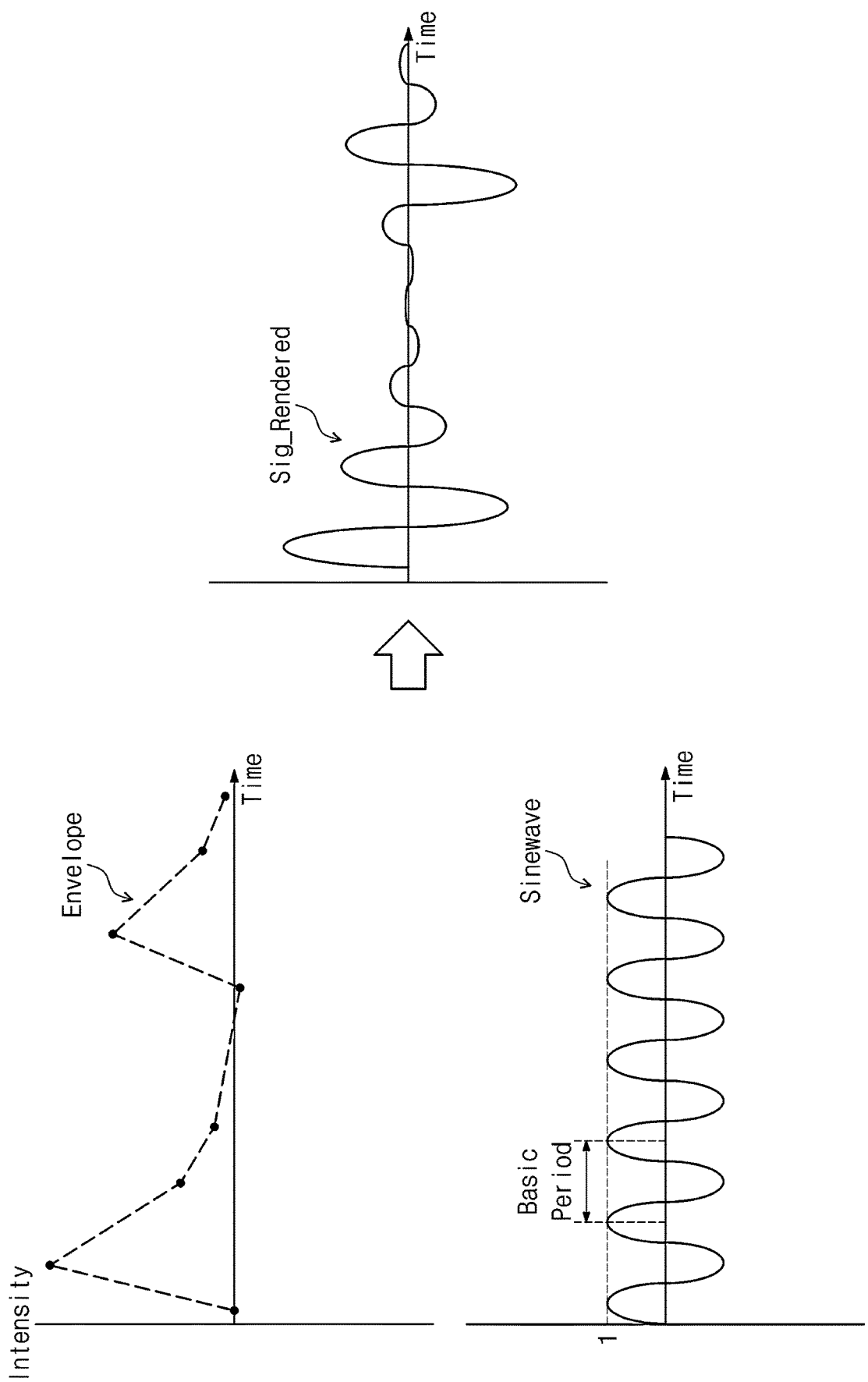
FIG. 8 is a diagram for describing the generation of a rendered waveform signal in operation S430 of FIG. 7.

FIG. 7 is a flowchart illustrating an operation of generating a rendered waveform signal in the signal rendering unit of FIG. 1. FIG. 8 is a diagram for describing the generation of a rendered waveform signal in operation S430 of FIG. 7. Hereinafter, operation of the signal rendering unit 400 will be described in detail with reference to FIGS. 7 and 8.

Referring to FIG. 7, in operation S410, the signal rendering unit 400 may receive the class selection signal select_class from the terminal 500. The class selection signal select_class may be a signal for selecting haptic waveform information Data_haptic of a specific class among pieces of haptic waveform information Data_haptic stored in the library storage unit 300.

In operation S420, the signal rendering unit 400 may receive, from the library storage unit 300, the haptic waveform information Data_haptic corresponding to the class selected by the class selection signal select_class. The haptic waveform information Data_haptic received by the signal rendering unit 400 may include information about a basic frequency and envelope corresponding to the selected class.

In operation S430, the signal rendering unit 400 may generate the rendered waveform signal Sig_rendered based on the basic frequency and the envelope.

Referring to FIG. 8, the signal rendering unit 400 may generate a sinewave having the same oscillation frequency as the basic frequency and having an amplitude of 1. Thereafter, the signal rendering unit 400 may generate the rendered waveform signal Sig_rendered by combining the generated sinewave with the envelope. For example, the signal rendering unit 400 may generate the rendered waveform signal Sig_rendered by multiplying the envelope by the sinewave.

In operation S440, the signal rendering unit 400 may provide the generated rendered waveform signal Sig_rendered to the terminal 500.

The terminal 500 may implement a tactile texture waveform by reproducing, through an interface provided in the terminal 500, the rendered waveform signal Sig_rendered received from the signal rendering unit 400.

Figure 9A:
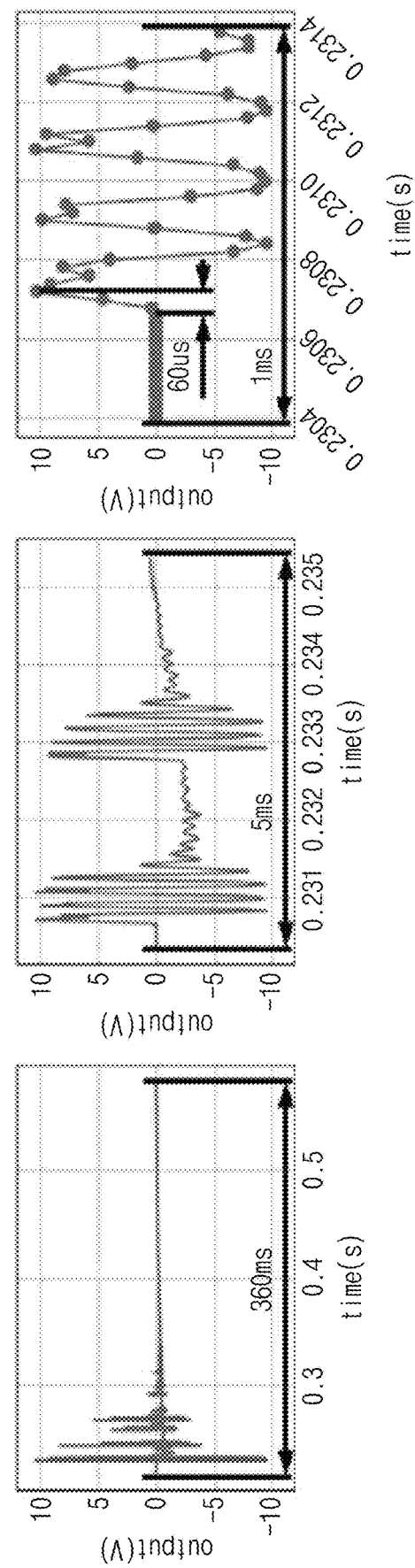
FIGS. 9A to 9C are diagrams illustrating sensing signals measured from example target objects by a haptic feedback system according to the present disclosure.
Figure 9B:
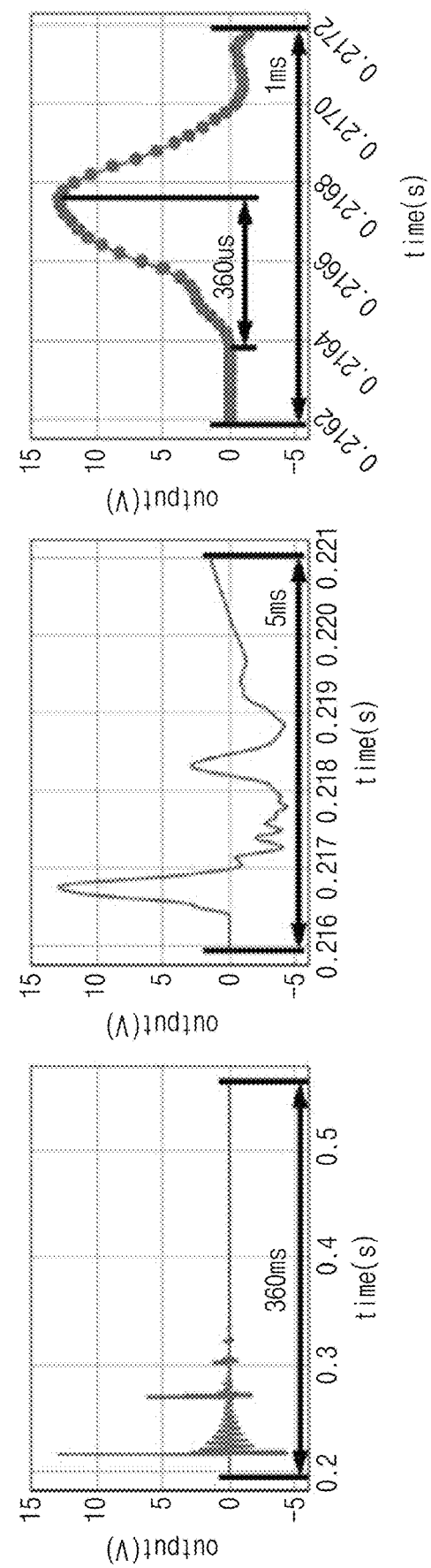
Figure 9C:
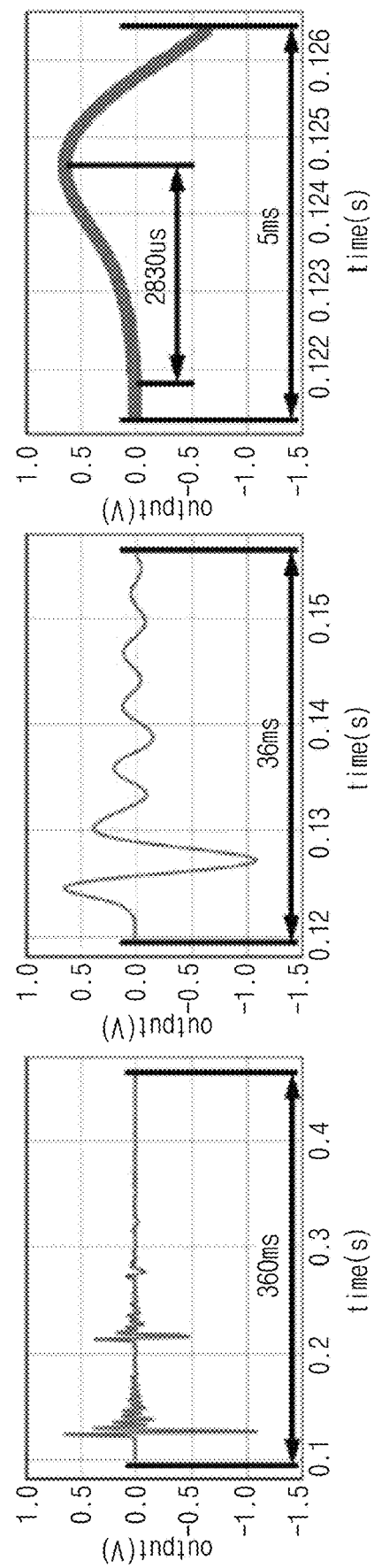
Figure 10A:
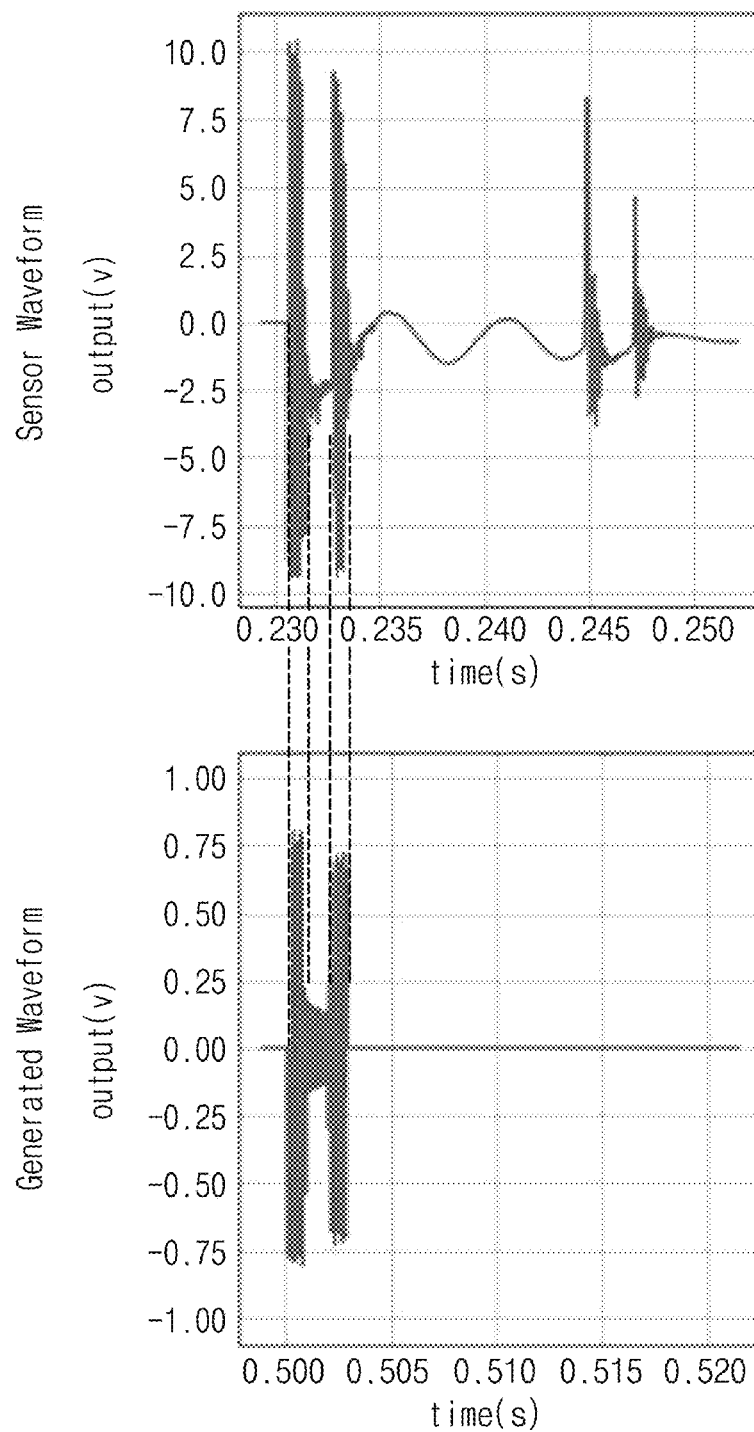
FIGS. 10A to 10C are diagrams illustrating sensing signals and rendered waveform signals of the example target objects of FIG. 9.
Figure 10B:
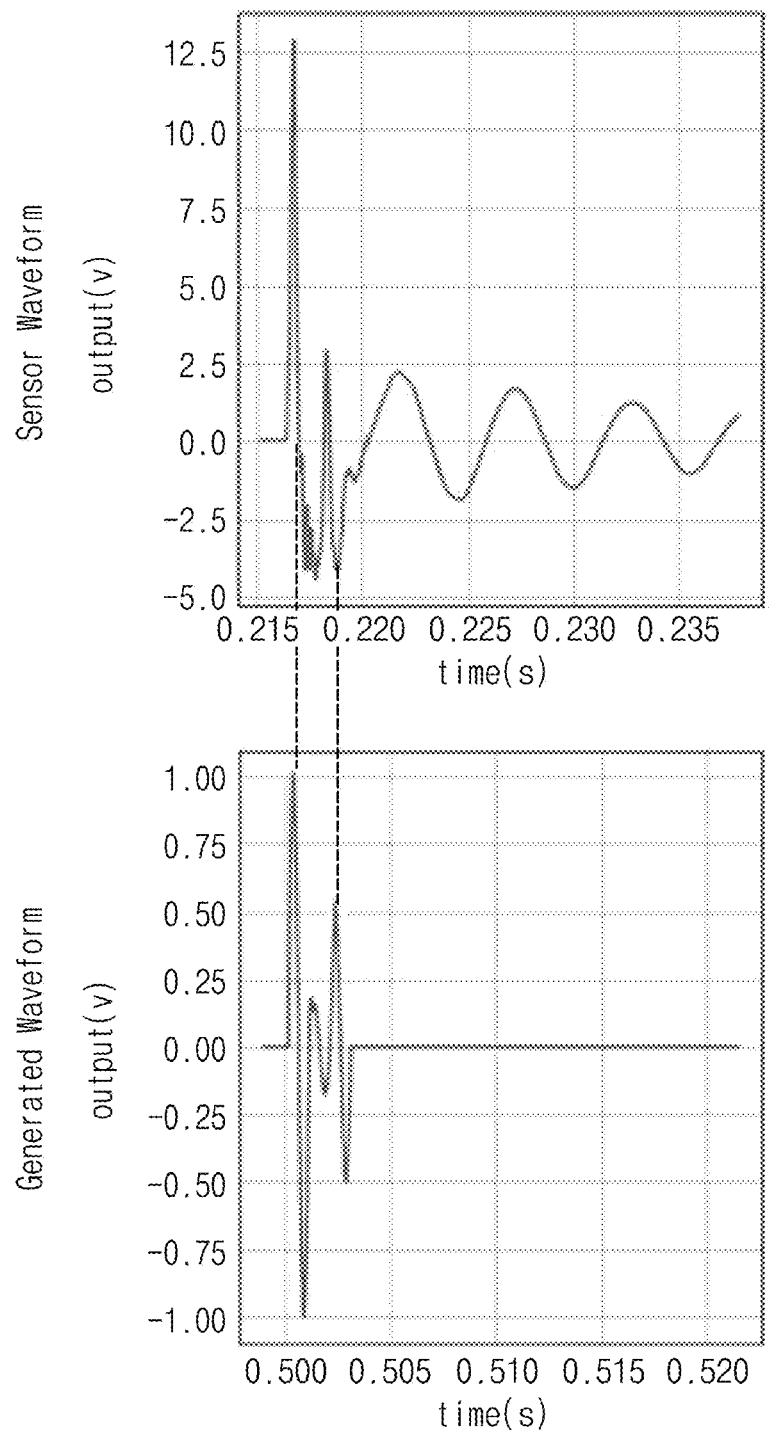
Figure 10C:
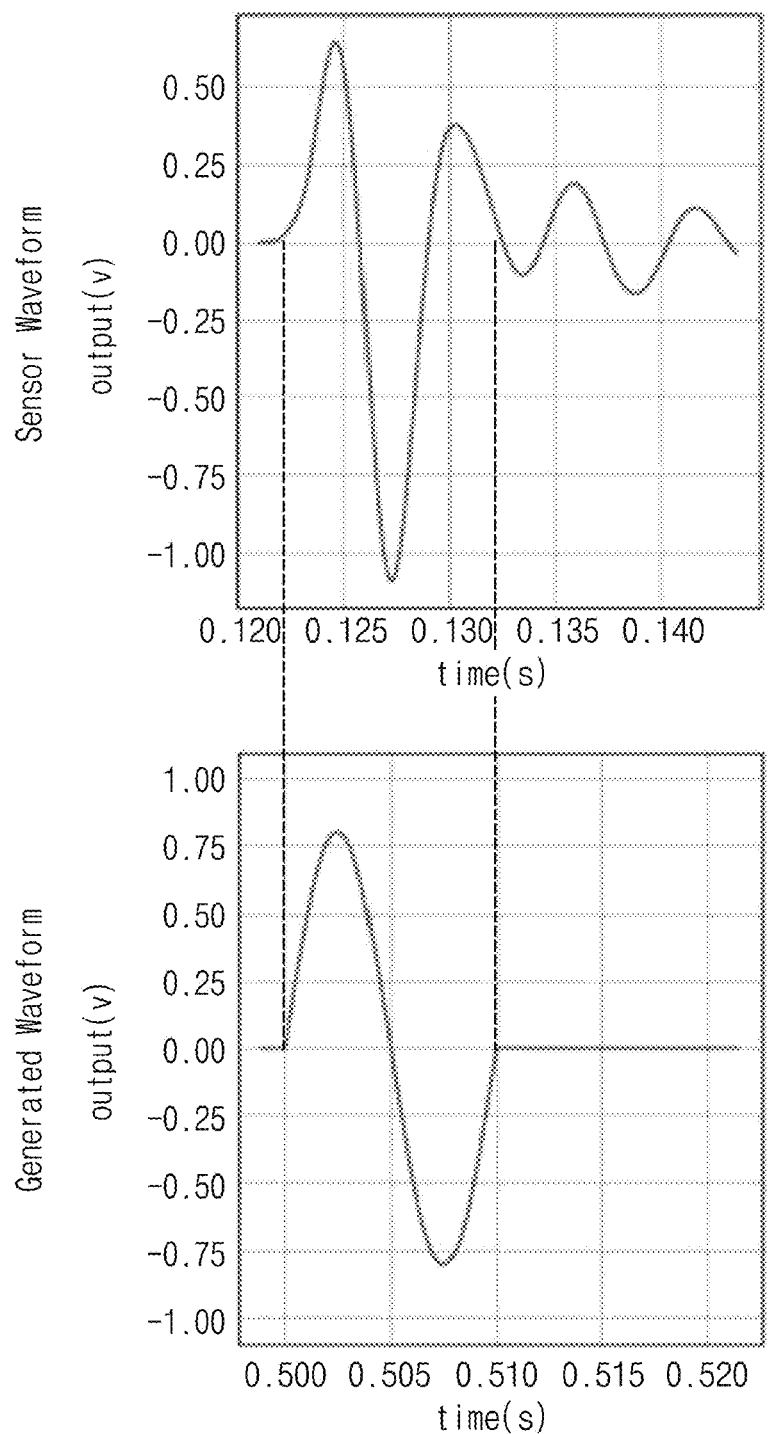

FIGS. 9A to 9C are diagrams illustrating sensing signals measured from example target objects by the haptic feedback system HFS according to the present disclosure. FIGS. 10A to 10C are diagrams illustrating sensing signals and rendered waveform signals of the example target objects of FIG. 9.

Hereinafter, examples of a sensing signal, basic frequency, envelope, and rendered waveform signal generated in an embodiment of the present disclosure, described with reference to FIGS. 1 to 8, will be described with reference to FIGS. 9A to 10C.

FIG. 9A is a graph illustrating a sensing signal measured by a sensor when the target object is metal. The rising time for metal is about 60 microseconds in the right graph in which the time interval is scaled to 1 ms.

FIGS. 9B and 9C are graphs illustrating sensing signals measured by a sensor when the target object is wood and rubber, respectively. It may be recognized that the rising time for wood is about 360 microseconds, and the rising time for rubber is about 2830 microseconds.

FIG. 10A is a graph illustrating a sensing signal measured from metal by a sensor and a rendered waveform signal generated by a signal rendering unit. Referring to FIG. 10A, it may be identified that the rendered waveform signal generated by the signal rendering unit has a waveform similar to the sensing signal measured by the sensor.

Similarly, referring to FIGS. 10B and 10C, with regard to wood and rubber, it may also be identified that the rendered waveform signal generated by the signal rendering unit has a waveform similar to the sensing signal measured by the sensor.

Figure 11A:
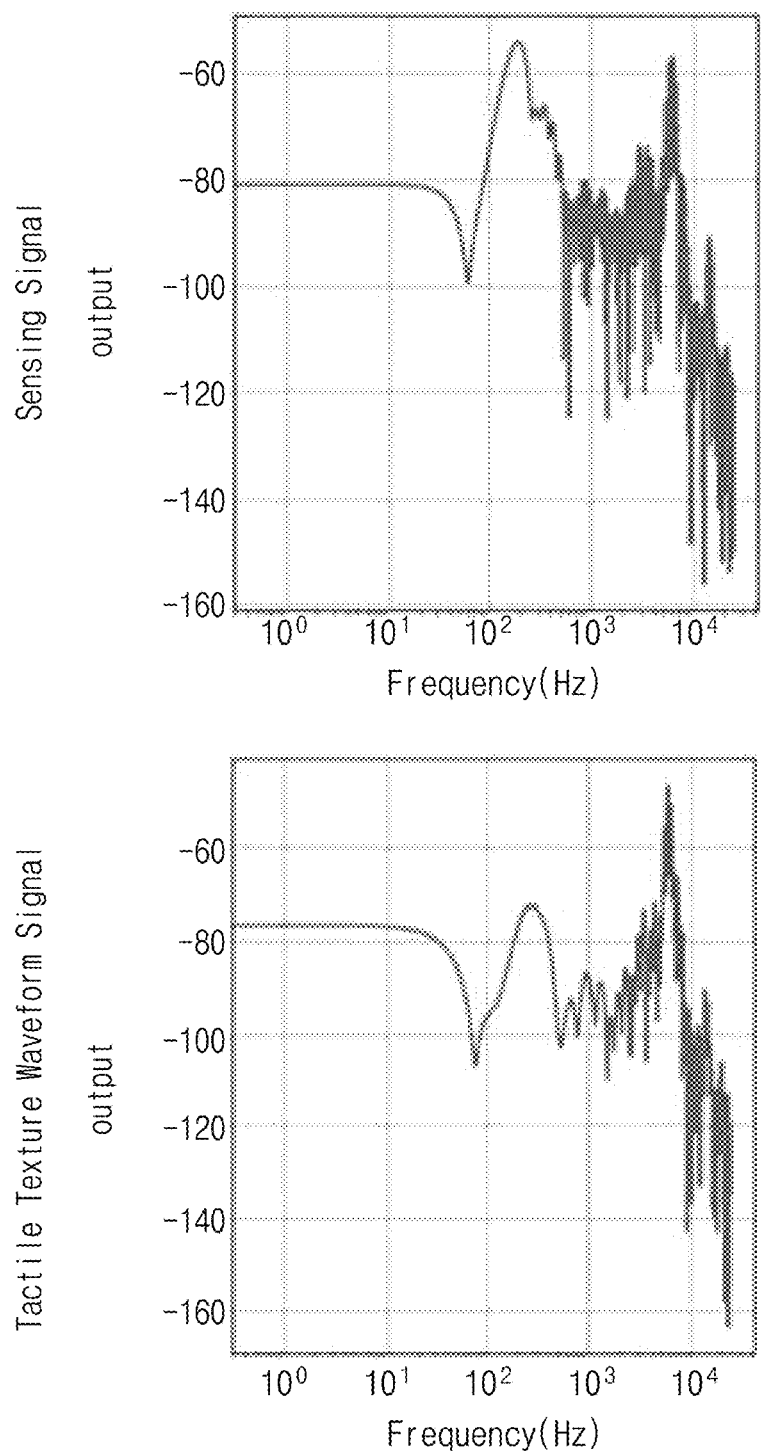
FIGS. 11A to 11C are graphs illustrating a comparison between the tactile texture waveform signal reproduced in the terminal of FIG. 1 and a sensing signal.
Figure 11B:
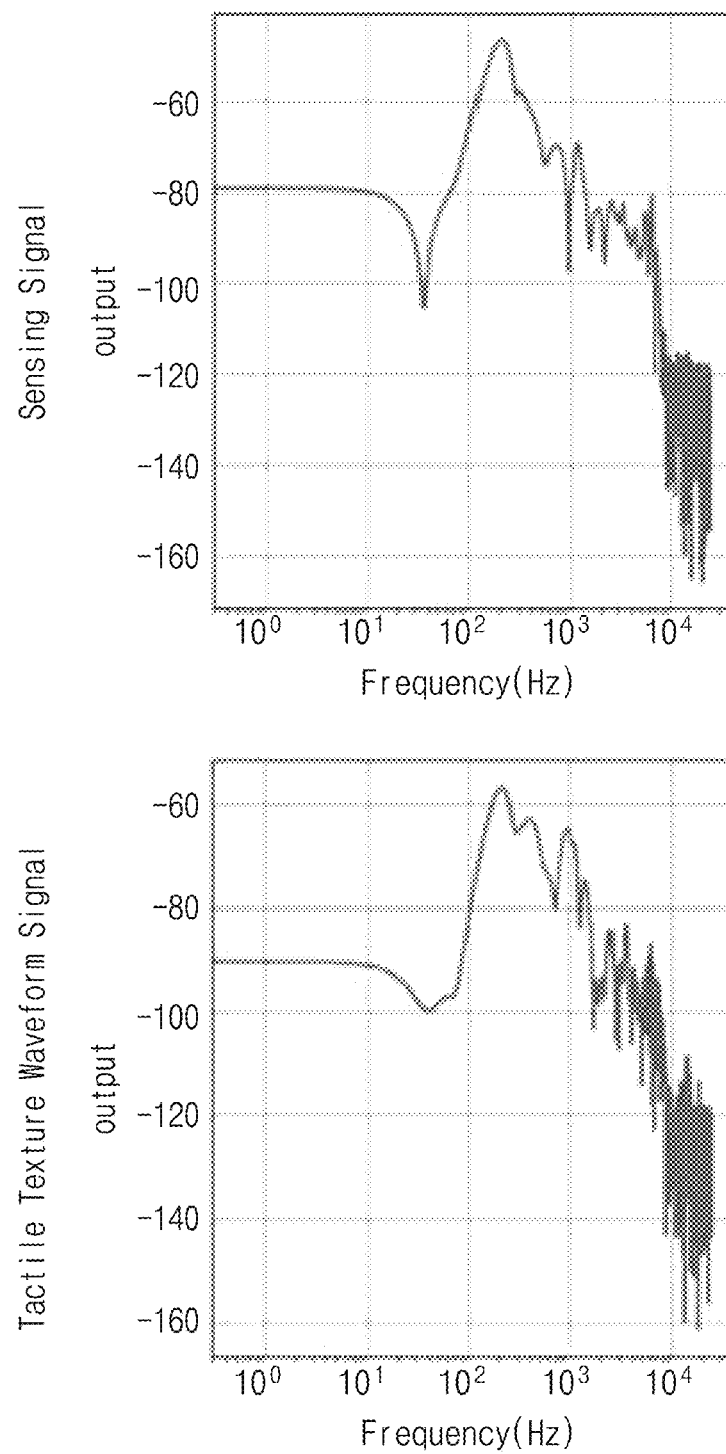
Figure 11C:
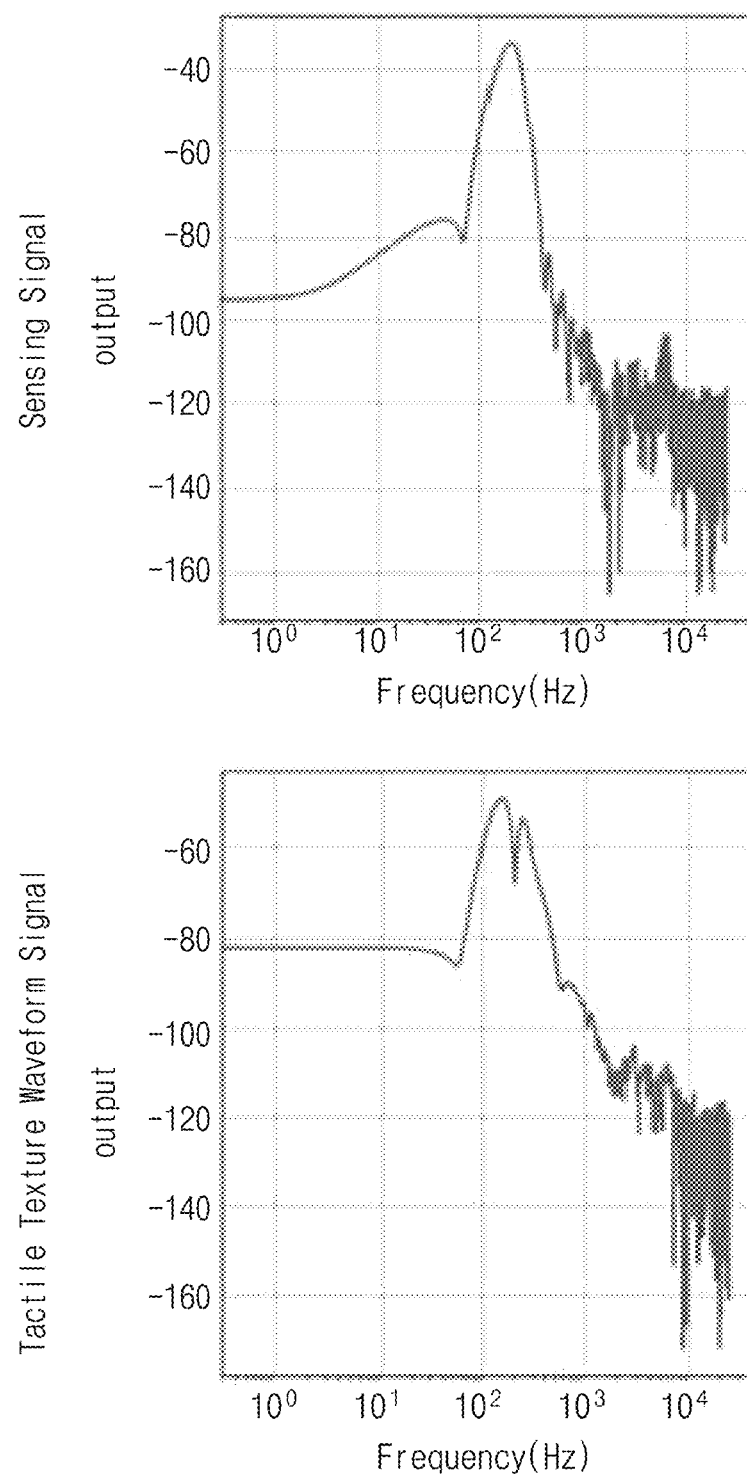

FIG. 11A is a graph illustrating a comparison between the tactile texture waveform signal reproduced in the terminal of FIG. 1 and frequency response characteristics of the sensing signal in the case of metal. FIG. 11B is a graph illustrating a comparison between the tactile texture waveform signal reproduced in the terminal of FIG. 1 and frequency response characteristics of the sensing signal in the case of wood. FIG. 11C is a graph illustrating a comparison between the tactile texture waveform signal reproduced in the terminal of FIG. 1 and frequency response characteristics of the sensing signal in the case of rubber. The tactile texture waveform signals shown in FIGS. 11A to 11C were measured by providing a separate sensor to the interface for reproducing the rendered waveform signal in the terminal.

Referring to FIGS. 11A to 11C, it may be identified that the sensing signal measured by the sensor and the tactile texture waveform signal generated in the terminal have similar frequency response characteristics in each case of metal, wood, and rubber.

The present disclosure may provide a system for achieving a tactile texture waveform at low cost and low computational load.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A haptic waveform storage system comprising:
   a sensor configured to measure a target object to generate a sensing signal including tactile texture information;
   a waveform extraction unit configured to extract a basic frequency and an envelope from the sensing signal and generate haptic waveform information including information about the basic frequency and the envelope; and
   a library storage unit configured to store the haptic waveform information,
   wherein the waveform extraction unit is configured to set a reciprocal number of the basic frequency as a basic period and extract a point having highest intensity from the sensing signal every basic period to extract the envelope.

2. The haptic waveform storage system of claim 1, wherein the waveform extraction unit is configured to calculate the basic frequency based on a rising time of the sensing signal.

3. The haptic waveform storage system of claim 1,
   wherein the waveform extraction unit is configured to receive a class setting input for classifying a type of the target object to classify and label the haptic waveform information, and
   the library storage unit is configured to store the labeled haptic waveform information in a library form.

4. The haptic waveform storage system of claim 3, wherein the number of classes in the class setting input is determined according to the type of the target object, a type of a material, and a type of a measurement situation.

5. The haptic waveform storage system of claim 3,
   wherein the library storage unit includes a class table,
   wherein the class table is configured to store the haptic waveform information in a library form.

6. The haptic waveform storage system of claim 1, wherein the library storage unit includes a data storage medium.

7. A method for operating a haptic waveform storage system, the method comprising:
   generating a sensing signal including tactile texture information by measuring a target object;
   calculating a basic frequency based on a rising time of the sensing signal;
   extracting an envelope by setting a basic period corresponding to a reciprocal number of the basic frequency and by extracting a point having highest intensity from the sensing signal every basic period; and
   storing haptic waveform information including information about the basic frequency and the envelope in a library storage unit.

8. The method of claim 7, comprising:
   receiving a class setting input for classifying a type of the target object;
   classifying and labeling the haptic waveform information based on the class setting input; and
   storing, in the library storage unit, the labeled haptic waveform information in a library form.

9. The method of claim 8, wherein the number of classes in the class setting input is determined according to the type of the target object, a type of a material, and a type of a measurement situation.

10. The method of claim 8,
    wherein the library storage unit includes a class table,
    wherein the class table stores the haptic waveform information in a library form.

11. The method of claim 7, wherein the library storage unit includes a data storage medium.

12. A haptic feedback system comprising:
    a haptic waveform storage system configured to generate haptic waveform information from a target object and store the haptic waveform information in a library storage unit; and
    a haptic waveform generation system configured to generate a tactile texture waveform based on the haptic waveform information stored in the library storage unit,
    wherein the haptic waveform information includes information about a basic frequency calculated from a sensing signal measured from the target object and an envelope extracted from the sensing signal,
    wherein the haptic waveform storage system is configured to calculate the basic frequency based on a rising time of the sensing signal and generate the haptic waveform information including information about the basic frequency and the envelope, and
    wherein the haptic waveform generation system is configured to generate a rendered waveform signal by generating a sinewave having the same frequency as the basic frequency and combining the sinewave with the envelope, and generate the tactile texture waveform based on the rendered waveform signal.

13. The haptic feedback system of claim 12, wherein the haptic waveform generation system includes:

a signal rendering unit configured to receive the haptic waveform information from the library storage unit and generate the rendered waveform signal; and a terminal configured to generate the tactile texture waveform by reproducing the rendered waveform signal.

14. The haptic feedback system of claim 13, wherein the terminal is a virtual reality (VR) device in which virtual reality is implemented, and the terminal is configured to generate a class selection signal including class information corresponding to an object interacting in the virtual reality, and wherein the signal rendering unit is configured to receive the haptic waveform information from the library storage unit based on the class selection signal.

15. The haptic feedback system of claim 14, wherein the terminal includes an interface directly connected to a hand of a user, wherein the interface is configured to generate the tactile texture waveform by reproducing the rendered waveform signal.

16. The haptic feedback system of claim 12, wherein the haptic waveform storage system is configured to set a reciprocal number of the basic frequency as a basic period and extract a point having highest intensity from the sensing signal every basic period to extract the envelope.

17. The haptic feedback system of claim 14, wherein the library storage unit includes a data storage medium.

18. The haptic feedback system of claim 14, wherein the library storage unit includes a class table configured to store the haptic waveform information.

* * * * *